United States Patent [19]

Uemura

[11] 4,442,879

[45] Apr. 17, 1984

[54] IRREGULAR WEAR-RESISTANT RADIAL PLY TIRE

[75] Inventor: Yukihisa Uemura, Nara, Japan

[73] Assignee: The Toyo Rubber Industry Co., Ltd., Osaka, Japan

[21] Appl. No.: 372,852

[22] Filed: Apr. 29, 1982

Related U.S. Application Data

[63] Continuation of Ser. No. 190,789, filed as PCTJP79/00135, May 29, 1979, published as WO80/00015, Jan. 10, 1980, § 102(e) Jan. 18, 1980, abandoned.

[30] Foreign Application Priority Data

Jun. 7, 1978 [JP] Japan .................................. 53-69209

[51] Int. Cl.³ ...................... B60C 11/04; B60C 13/00
[52] U.S. Cl. ............................ 152/209 R; 152/352 R; 152/374
[58] Field of Search ............... 152/209, 352 R, 353 R, 152/374

[56] References Cited

U.S. PATENT DOCUMENTS

| 1,348,200 | 8/1920 | Beaumont | 152/209 R |
| 3,517,720 | 6/1970 | Brown | 152/352 |
| 3,735,791 | 5/1973 | McKissick et al. | 152/352 |
| 3,971,424 | 7/1976 | Boileau | 152/209 R |
| 4,044,810 | 8/1977 | Taniguchi et al. | 152/209 R |
| 4,155,392 | 5/1979 | Duderstadt et al. | 152/330 R |

FOREIGN PATENT DOCUMENTS

| 2343747 | 3/1975 | Fed. Rep. of Germany . |
| 2214602 | 8/1974 | France . |
| 542732 | 11/1973 | Switzerland . |

Primary Examiner—Lois E. Boland
Attorney, Agent, or Firm—Flynn, Thiel, Boutell & Tanis

[57] ABSTRACT

A radial ply tire having structure thereon for minimizing the wear characteristic of the lateral edges of the tread. The tire has a central zone which consists of a curved surface at a radius $R_1$ to a specified distance from the centerline of the tire and a curved surface at a radius $R_2$ over the near-shoulder zones from the lateral edges of the central zone to a lateral boundary of the lateral shoulder on the tire. The near-shoulder zones on the tire have an intermediate position C thereon located at a specified distance ($W_1$) from the center line so that the specified position ($W_1$) is also spaced a further specified distance (d) radially outward from a position (A) located at the aforesaid specified distance ($W_1$) on an imaginary curved surface extrapolated from the radius of curvature $R_1$.

2 Claims, 7 Drawing Figures

IRREGULAR WEAR-RESISTANT RADIAL PLY TIRE

This application is a continuation of application Ser. No. 190,789, filed as PCT JP79/00135, May 29, 1979 published as WO80/00015, Jan. 10, 1980, § 102(e) dated Jan. 18, 1980, now abandoned.

TECHNICAL FIELD

This invention relates to an improvement in wear resistance of radial ply tires and more particularly, to radial ply tires capable of increased wear life by reason of an improvement related to irregular wear or excessive wear which is liable to occur in the shoulder portions thereof.

BACKGROUND ART

In general, radial ply tires have many advantages over bias ply tires, for instance, good wear resistance, low rolling resistance, low heat build-up, good durability, good cornering property, etc.

They, however, have a drawback that the shoulder portions extending from both the terminals of the tread portion are apt to wear off and, in addition, an irregular wear phenomenon is likely to occur in which the shoulder portions do not uniformly and equally wear over the circumference.

It is well known in service use as well as in laboratory tests that irregular wear or excessive wear occurs mostly when radial ply tires are used, particularly as front wheels (steering wheels) of a car. Such irregular wear of the shoulder portions at an early stage impairs essential performances inherent in the tires to a great extent.

For example, because of the fact that the shoulder portions wear off early but the rubber material is retained in the central portion of the tread, the wear life of the tire is shortened; the shoulder portions thus worn excessively contact the ground, causing vibration and leading to a state of being ready to slip.

It is generally preferred that when irregular wear has occurred at the front wheel tires in this way, the front wheel tires and rear wheel tires in which irregular wear hardly ever occurs, are switched in order to prolong the life of the tires.

This countermeasure is taught to the public by the manual of standard maintenance and is widely practiced. The tire exchange procedure is, however, troublesome and entails much labour and time, so that it is difficult to make drivers conform to the manual. Thus, the general tendency has been towards aggravating irregular wear of the front wheel tires.

In order to solve these disadvantageous problems, various attempts have hitherto been made. For example, shoulder portions have been altered in belt construction; a tread has been constructed so that the rubbers of the central portion and the lateral portions near the shoulders are different from each other in wear resistance.

To achieve this, however, it is necessary to alter greatly the processing machines in the current production line or to change the order of steps in the line, which leads to too large an increase in cost to meet demand. The idea has therefore not been put into practice.

In view of the current situation, this invention has the object of providing a novel radial ply tire in which a device for diminishing irregular wear or excessive wear can be easily created by a slight modification of the current production line. Specifically, an investigation into fundamental causes for the irregular wear occurring in the shoulder portions was conducted, from which a correlation between the contoured shape of carcass plies and the profile of the tread portion after inflation was deduced. Thus, in this invention, a radial ply tire capable of greatly improved irregular wear resistance is provided by relating the tread profile a tire is expected to assume after air inflation with the configuration of the tread wall of a mould used in the vulcanization-moulding step.

SUMMARY OF INVENTION

This invention is predicated on the findings that in a general radial ply tire, the tread portion is divided into a central zone where irregular wear is not likely to occur and lateral zones extending adjacent thereto where irregular wear is likely to occur by borderlines at definite positions. These borderlines are determined by a definite relation equation in terms of the section width and section height of the tire when inflated to a prescribed air pressure. The magnitude of deformation of the lateral zone in the inflated condition is proportional to the section height of the tire.

According to this invention, a radial ply tire is provided wherein the tread portion capable of decreased irregular wear has its near-shoulder zones each extending laterally spaced apart from the position a straight distance of: $W/2 - 0.365 H$ (W and H are section width and section height, respectively, of the tire when inflated to a prescribed air pressure) from the mid-circumferential line of the tire towards the shoulder, and the near-shoulder zones are each formed with a thick rubber portion gradually thickening toward the lateral edge thereof. Also, a mould for the production of that tire is constructed so that the inner wall profile for shaping the tread of the tire consists of two different curved surfaces, i.e. a curved surface for shaping of the near-shoulder zone of the tire and a curved surface for shaping the central zone of the tire, the former having a larger radius of curvature than the latter.

Additionally, the present invention also provides a radial ply tire having irregular wear resistance, wherein the central zones of the tread are provided with continuous circumferential grooves.

DETAILED DESCRIPTION

This invention will be hereinafter described in detail with reference to the accompanying FIGS. 1 to 4 to facilitate understanding of this invention, before referring to embodiments of this invention having the above-mentioned features.

Figure 1:
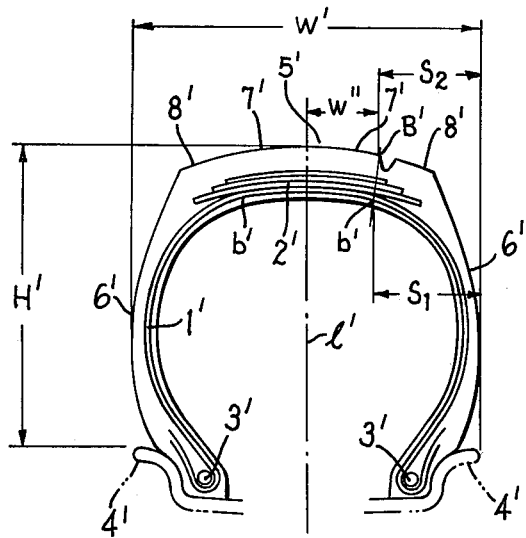
FIG. 1 is a cross-sectional view of a conventional radial ply tire when inflated to a prescribed air pressure.

FIG. 1 shows a conventional radial ply tire inflated to a prescribed air pressure in the cross-section of a plane containing the rolling axis of the tire, in which the reference numeral 1' designates radial carcass plies, the reference numeral 2' designates steel belts, the reference numeral 3' designates bead wires, the reference numeral 4' designates a rim flange portion, the reference numeral 5' designates a tread portion and the reference numeral 6' designates a sidewall portion. The tread portion consists of central zones 7', 7' extending on both sides of the mid-circumferential line (equatorial line) 1' of the tire up to the points B', B' and near-shoulder zones 8', 8' extending on both sides of said zones 7' and contiguous to the sidewall portions 6', 6'.

The aforesaid points B', B' are points on the tread portion to which a normal is drawn from contact points b', b' of the curved surface of crown cords and the curved surface of sidewall ply cords, the former having a larger radius of curvature than the the latter.

Figure 4:
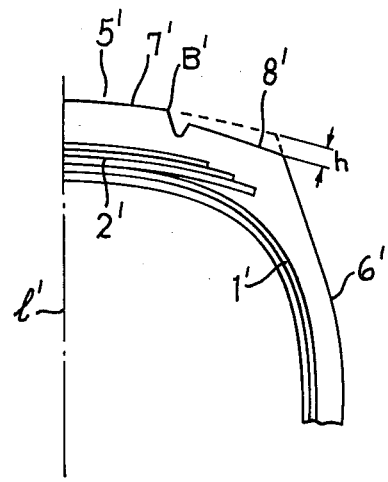
FIG. 4 is a schematic view illustrating a wearing state of a conventional radial ply tire.

It was empirically proven that the irregular wear or excessive wear at the near-shoulder zones 8', 8' of a conventional radial ply tire occurs to a great extent at the zones 8' each extending from the point B' toward the shoulder as shown by way of enlargement in FIG. 4.

Figure 2:
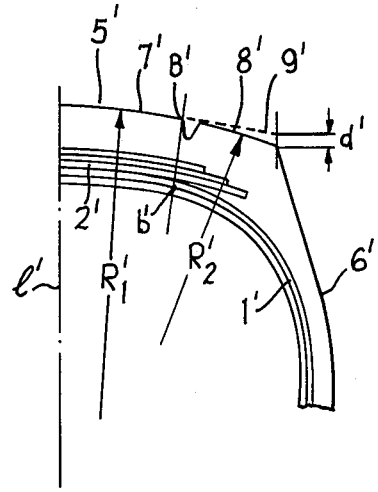
FIG. 2 is an enlarged view of the essential part of FIG. 1.

In producing the radial ply tire having such usual construction, vulcanization and moulding are carried out by means of a vulcanization mould M' (FIG. 3) whose inner wall profile 5M' for shaping the tread of the tire is formed with a single radius of curvature R'. The resulting tire, upon inflation to a prescribed air pressure as shown in FIG. 2, is formed so that the tread portion 5' comprises rubber layers of curved surfaces having two radii of curvature, with the central zone 7' having a larger radius of curvature $R_1'$ with the near-shoulder zone 8' extending from near the point B' having a smaller radius $R_2'$ of curvature than $R_1'$.

Furthermore, the near-shoulder zone 8' assumes a state that its area of contact with the ground subsides inward by a distance of d' vis-a-vis the imaginary curved surface extrapolated and drawn from the area of the central zone 7' in contact with the ground.

Thus, it would be evident from the investigation into such tread profile that the tire, when the tread profile is in contact with the flat road surface and deformed to a flat area in the tread portion, the near-shoulder zone 8' extending from the point B' is deformed and slipped against the road surface to a greater extent as compared with the central zone 7'.

In addition to this, the near-shoulder zone 8' is lowered more greatly in respect of the pressure of contact exerted on the ground as compared with the central zone 7', so that the friction force between the tread portion 5' and the road surface is also decreased leading to a state that the near-shoulder zone is more liable to slip than the central zone 7'.

When such profiled tires are mounted on front wheels and are steered, a sideslip angle is created at the tires, so that the tires run while sideslipping. As a result, wear on the near-shoulder zone 8', which is deformed greatly and which is ready to slip upon being in contact with the ground, is accelerated and wear occurs faster by the amount of h as compared with the central zone 7' as shown in FIG. 4, which results in the occurrence of irregular or excessive wear phenomenon.

From this standpoint, extensive experiments and measurements were performed in order to search into the cause for irregular wear or excessive wear at the near-shoulder zone 8' and the following facts were found:

In the radial ply tire as shown in FIG. 1, assuming that under a prescribed inflated condition the section height of the tire protruding outward of the rim flange 4' is H' and the section width of the tire is W', an investigation into many tires diverse in size and flatness ratio was carried out with respect to the variation of the point b' vs. the height H' and as a result, the distance $S_1$ from the position of the maximum width W' in the width direction to the point b' turned out to be generally in the range of 0.290 to 0.385 time the height H'.

It was further found that the local deformation as shown in FIG. 2 occurs in the near-shoulder zone 8' which extends laterally outwardly of the point B' with which a normal from the point b' toward the area of contact between the tread portion 5' and the ground intersects.

The distance $S_2$ from the point B' to the position of the maximum width in parallel with the mid-circumferential line 1' of the tire was proven to be in the range of from 0.25 to 0.45, mostly in the range of from 0.276 to 0.365, times the height H'. In other words, the distance W''' in the width direction from the mid-circumferential line 1' to the point B' is represented by the range:

$$W'/2 - 0.276H' \geq W''' \geq W'/2 - 0.365H'$$

Figure 3:
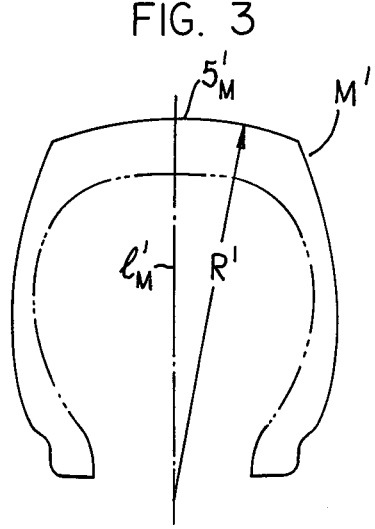
FIG. 3 is a cross-sectional view of the inner wall configuration of a conventional vulcanization mould.

On the other hand, with the tire produced by means of a mould M' as shown in FIG. 3 which is formed having a single radius of curvature R' on the tread-shaping portion 5M', local deformation in the near-shoulder zone 8' as shown in FIG. 2 was investigated. Consequently, it was proven that the magnitude of deformation (expressed in terms of thickness), d' is in the range of about 0.004 H' to 0.015 H'.

The radial ply tire of this invention thus has been accomplished based on the findings described above on irregular wear phenomenon. One example of the radial ply tire is illustrated in FIG. 5, wherein the tread portion 5 consists of central zones 7, 7 each of which extend on both sides of the mid-circumferential line 1 of the tire to the point B that is a point drawn from the tangential point b of the curved surfaces of crown ply cords and sidewall ply cords to the tread and near-shoulder zones 8, 8 which each extend laterally adjacent to said central zone at the point B.

The central zone 7 extends within a straight distance of $W_2$ from the mid-circumferential line 1 of the tire, which distance is obtained by subtracting 36.5 % of the section height H from ½ of the section width W of the tire when inflated to a prescribed air pressure, namely $W_2 = W/2 - 0.365 H$.

The near-shoulder zone 8 is formed with a thickened rubber portion 9 increased progressively in thickness toward the shoulder (hereinafter simply referred to as "thickened rubber portion") so as not to assume, under a prescribed inflated condition, a curved surface radially inward of the hypothetical curved surface elongated and drawn from the curved surface of the central zone. Stated another way, the curved surface will assume having a single radius of curvature over from the central zone to the near-shoulder zone.

Figure 5:
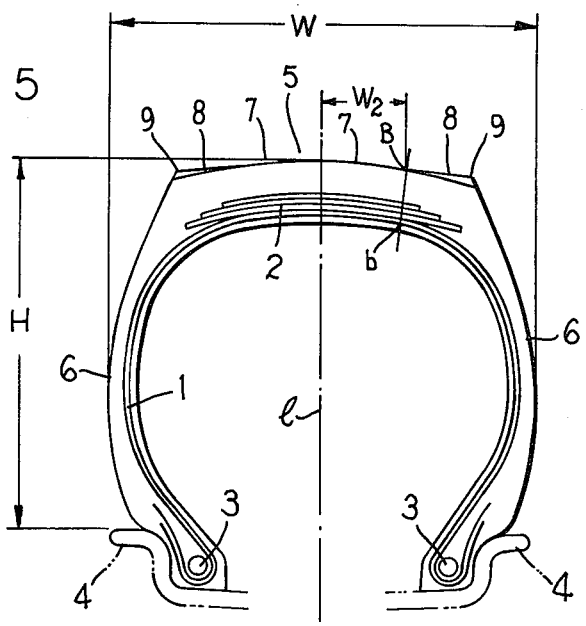
FIG. 5 is a cross-sectional view of one example of a radial ply tire according to this invention when inflated under inner pressure.
Figure 6:
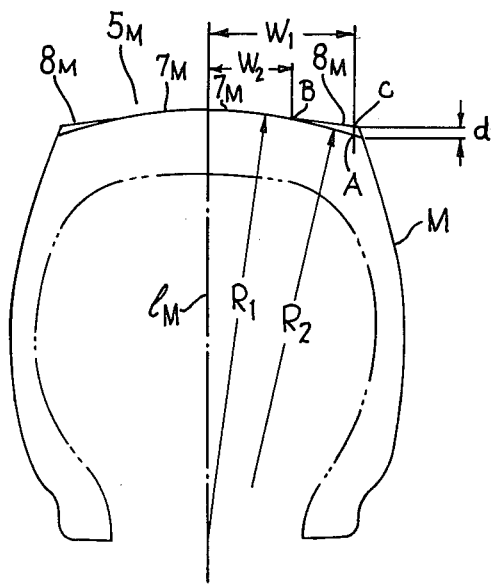
FIG. 6 is a cross-sectional view showing the inner wall profile of a vulcanization mould pertaining to the tire of this invention.

The mould M for producing the tire of FIG. 5 is constructed as shown in FIG. 6. In the mould M, the tread-shaping inner wall 5M consists of two curved surfaces, namely central zone-shaping portions 7M, 7M having a radius of curvature $R_1$, each of which extends within said distance of $W_2$ from the centerline 1M of the mould and near-shoulder zone-shaping portions 8M, 8M having a radius of curvature $R_2$, each of which extends adjacent to the central zone-shaping portion at the boundary B.

Here the radius of curvature, $R_2$ of the near-shoulder zone-shaping portion 8M is constructed larger than the radius of curvature $R_1$ of the central zone-shaping portion 8M such that the position of C on it located at a straight distance of $W_1$:

$$W_1 = W/2 = 0.2H$$

(wherein W and H are a section width and a section height, respectively, of the tire when inflated to a prescribed air pressure) from the center line 1M of the mould is spaced apart a distance of d expressed by the equation:

$$0.4 \times 10^{-2} H \geq d \geq 1.5 \times 10^{-2} H$$

(H is the same as above) radially outward of the imaginary position A which is located on the hypothetical curved surface elongated and drawn (having the radius of curvature $R_1$) from the curved surface of said central zone-shaping portion 7M likewise at a distance of $W_1$ from the center line 1M of the mould. This distance d corresponds to the magnitude d' of local deformation at the near-shoulder zone 8' of a conventional tire.

The vulcanization and moulding of a tire by the use of the mould M thus far described enables the formation of the thickened rubber portion 9 as shown in FIG. 5 on the area of contact with the ground at the near-shoulder zone 8.

The thickened rubber portion 9 will compensate for the locally deformed portion 9' as shown in FIG. 2 and accordingly, will prevent the shoulder portion from locally deforming unlike the conventional tire.

The curved surface of the entire tread 5 of the tire thus obtained approaches a single radius of curvature under a prescribed inflated condition.

A conventional mould for producing the present tire having the tread profile thus described above may be readily used by merely performing a simple modifying procedure such as by scraping the amount corresponding to the thickened rubber portion 9 off from the mould at the near-shoulder zone-shaping portions 8M, 8M by a grinding means. By reason of the resulting tread profile of the tire, it is thus feasible to prevent the irregular wear or excessive wear as described above at the near-shoulder zone.

Figure 7:
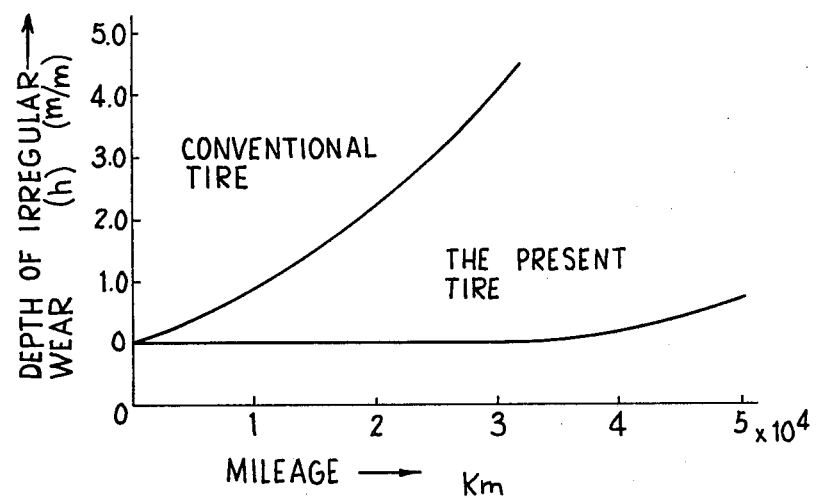
FIG. 7 is a graphical diagram showing relations of mileage and depth of wear with the present tire and a conventional tire in comparison.
Figure 1:
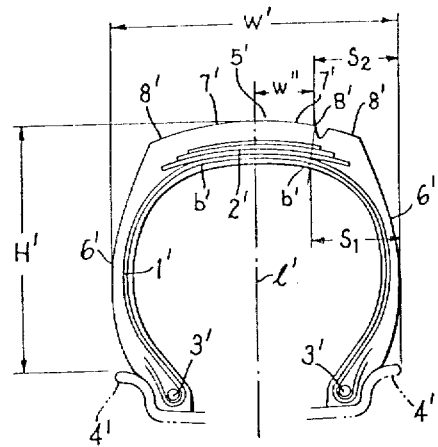
Figure 2:
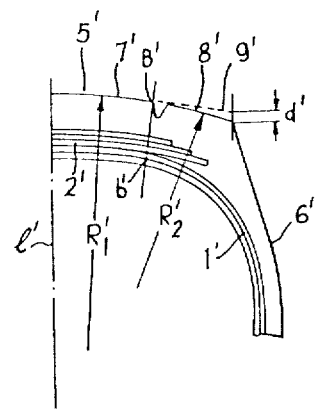
Figure 3:
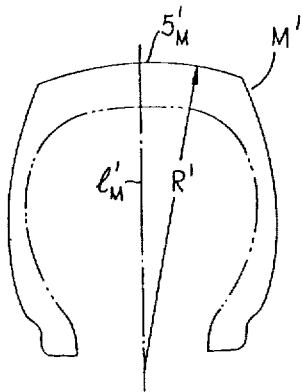
Figure 4:
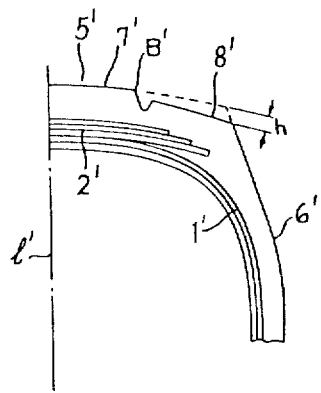

For the purpose of service tests, a radial ply tire of a type 10.00 R 20-14 PR according to this invention which is constructed to be $W_1 = W/2 - 0.2H$, $W_2 = W/2 - 0.365H$ and $d = 1.1 \times 10^{-2}$ H and a conventional radial ply tire of the same type were built up, mounted on the front wheels, and inflated to a prescribed air pressure (7.25 Kg/cm$^2$) as stipulated in JIS D 4202. Comparative service tests were conducted in that state for a long duration under the same running condition. The results are shown in FIG. 7, wherein the conventional tire causes local wear on the order of 4 mm at a mileage of thirty to forty thousand Km whereas the present tire causes little local wear. Thus, the reduction in wear resistance of this invention has been confirmed in practice.

In general radial ply tires as described above, when the tread portion 5' is in contact with the flat road surface and is deformed to a flat area, magnitudes of deformation and slip against the road surface are larger at the near-shoulder zone 8' than at the central zone 7'. Consequently, local irregular wear occurs particularly at the near-shoulder zone 8' which extends outwards of the point on the area of contact with the ground with which a normal from the tangential point of curved surface of crown ply cords and curved surface of sidewall ply cords to the contact area intersects.

An exemplary general radial ply tire of a size of 10.00 R 20-14 PR was measured with the aid of a sideslip tester in respect of sideslip characteristics when used as front wheels (steering wheels) (under the same air pressure as above). The tire side slipped because front wheel alignment, particularly toe-in was set. The magnitude (m/m) of sideslip becomes larger with the increase in toe-in magnitude (m/m). The foregoing size is directed to a large-size tire suitable for use in trucks or buses, but the above fact holds true also in a tire size for cars.

Thus, the near-shoulder zone 8' is liable to cause irregular wear because of the decrease in friction force between the road surface and the contact area due to decrease in the pressure of contact with the ground which is caused by large magnitudes of deformation and slip upon contact with the ground.

In the situation where the tire runs while causing sideslipping, in that state of being it is liable to cause irregular wear of a rib type and is placed in a condition of being susceptible to lateral deformation because of the low rigidity of the rib in the near-shoulder zone, i.e. the narrow rib width, so that wear occurs much in the near-shoulder zone, thus resulting in the occurrence of irregular wear.

From the analysis above, it follows that in order to achieve the intended object of this invention more efficiently, it is preferred not to provide the radial ply tire with such grooves that significantly effect the occurrence of irregular wear, more particularly continuous circumferential grooves in the portion liable to cause irregular wear, namely the near-shoulder zone 8.

That is, continuous circumferential grooves are provided in the central zones 7, 7 but not in the near-shoulder zones 8, 8, whereby the width of the shoulder rib can be significantly widened and the occurrence of irregular wear can be inhibited to the least possible extent.

Otherwise, the tire may be constructed so that the central zone 7 is provided with continuous circumferential grooves and the near-shoulder zone 8 is provided with discontinuous grooves or sipes.

As thus far described, the radial ply tire according to this invention is, on the one hand, characterized in that the near-shoulder zone is formed with the thickened rubber portion, on the basis of the findings that said zone liable to cause irregular wear is determined by the section height and section width of the tire when inflated to a prescribed air pressure and that the magnitude of deformation the zone is in proportional to the section height of the tire under the same condition.

The radial ply tire is, on the other hand, characterized in that the mould used for the production of it has a configuration that the tread-shaping inner wall consists of two curved surfaces of the near-shoulder zone-shaping portion and the central zone-shaping portion, the former having a larger radius of curvature than the latter, the former being such that a definite position on it is spaced apart a specified distance (capable of compensating the deformation magnitude upon inflation under a prescribed pressure) radially outward of the imaginary curved surface drawn and elongated from the latter.

Therefore, wear strength in the near-shoulder zone can be enhanced, so that the occurrence of irregular wear, such as excessive wear or partial wear can be prevented and the length of wear life can be increased.

Moreover, the present invention enables the production of a tire embodying the invention by the use of a currently used vulcanization mould slightly modified on the production line at an economical cost, and therefore, is of great worth in practicability.

The embodiments of the invention in which an exclusive property or privilege is claimed are defined as follows:

1. In a radial ply tire having irregular wear resistance comprising a tread portion that consists of central zones extending on both sides of the mid-circumferential line of the tire and near-shoulder zones extending laterally outwardly from said central zones to a lateral shoulder, said near-shoulder zones each being formed with a thickened rubber portion progressively increasing in thickness toward said shoulder, said near-shoulder zones, in the mold-in shape, having a larger radius of curvature ($R_2$) than that ($R_1$) of said central zones, the improvement comprising wherein said central zones each are within a straight distance of $W_2$ measured from said mid-circumferential line of said tire on both sides thereof, said distance $W_2$ being expressed as follows:

$$W_2 = W/2 - 0.365H$$

wherein W and H are, respectively, a section width and a section height outward of a rim flange of said tire when inflated to a prescribed air pressure, wherein only said control zones are provided with circumferential continuous grooves and said near-shoulder zones are free of continuous grooves; and wherein the mold-in shape of said central zone consists of a curved surface at said radius $R_1$ to said distance of $W_2$ from said mid-circumferential line of said tire and a curved surface at said radius $R_2$ over said near-shoulder zones from said lateral edges of said central zone to a lateral boundary of said near-shoulder zones, said near-shoulder zones being such that the spacing (d) between a position (C) thereon located at a distance of $W_1$ from said mid-circumferential line of said tire and a position (A) also located at the distance of $W_1$ from said mid-circumferential line but on an imaginary curved surface extrapolated from said radius of curvature $R_1$ is represented by the range:

$$0.4 \times 10^{-2} H \leq d \leq 1.5 \times 10^{-2}$$

and wherein:

$$W_1 = W/2 - 0.2H$$

W and H being the same as defined above; and
wherein said tread portion has a curved surface that assumes a single radius of curvature from said central zone to said near-shoulder zone upon inflation.

2. A radial ply tire as claimed in claim 1, wherein said near-shoulder zones are provided with discontinuous grooves or sipes.

* * * * *

UNITED STATES PATENT AND TRADEMARK OFFICE
CERTIFICATE OF CORRECTION

PATENT NO. : 4 442 879
DATED : April 17, 1984
INVENTOR(S) : Yukihisa Uemura

It is certified that error appears in the above-identified patent and that said Letters Patent is hereby corrected as shown below:

Sheet 1 of 3 of the Drawings consisting of Figures 1-4 should be deleted to appear as per the attached sheet.

Column 5, line 21; delete the equation and replace by
--- $0.4 \times 10^{-2} H \leq d \leq 1.5 \times 10^{-2} H$ ---.

Column 8, line 4; change "control" to ---central---.

Column 8, line 22; delete the equation and replace by
--- $0.4 \times 10^{-2} H \leq d \leq 1.5 \times 10^{-2}$ ---.

Signed and Sealed this

Nineteenth Day of February 1985

[SEAL]

Attest:

DONALD J. QUIGG

Attesting Officer    Acting Commissioner of Patents and Trademarks